Figure 1:
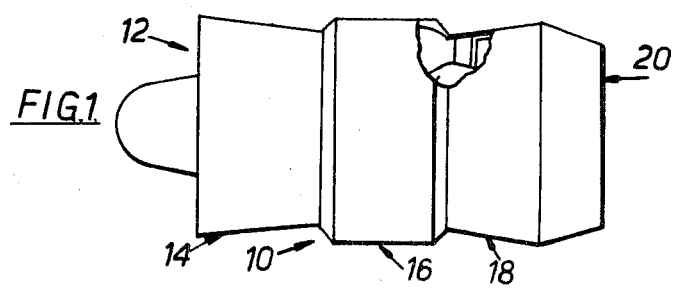

United States Patent

[11] 3,623,736

| [72] | Inventors | James A. Petrie<br>Littleover;<br>Willie Williamson, Shelton Lock, both of England |
|---|---|---|
| [21] | Appl. No. | 858,309 |
| [22] | Filed | Sept. 16, 1969 |
| [45] | Patented | Nov. 30, 1971 |
| [73] | Assignee | Rolls Royce Limited<br>Derby, England |
| [32] | Priority | Sept. 26, 1968 |
| [33] | | Great Britain |
| [31] | | 45,753/68 |

[54] SEALING DEVICE
5 Claims, 6 Drawing Figs.

[52] U.S. Cl. ........................................... 277/27, 277/73, 415/170
[51] Int. Cl. ........................................... F16j 15/48
[50] Field of Search ........................................... 415/112, 111, 110, 113, 173, 170; 277/57, 65, 82, 3, 27, 53, 73

[56] References Cited
UNITED STATES PATENTS
| 3,347,553 | 10/1967 | Schweiger | 277/27 |
| 3,501,245 | 3/1970 | Iuanko | 415/113 |

*Primary Examiner*—Robert I. Smith
*Attorney*—Cushman, Darby & Cushman

ABSTRACT: A sealing device mounted for axial movement on a stationary portion of a gas turbine engine and arranged to seal against the blade shroud of the high-pressure turbine of the engine. The sealing device is annular in form and has two lips defining an annular channel and a number of radial lands extending between the lips thereby defining a plurality of equispaced recesses. In operation the recesses in combination with the blade shroud form a number of chambers which are subjected to a variable pressure, the chambers being in communication with a source of high-pressure gas. If the clearance between the sealing device and the blade shroud decreases the pressure in the chambers increases and vice versa, the resultant pressure on the sealing device acting to maintain the clearance at a substantially constant value.

PATENTED NOV 30 1971

3,623,736

SHEET 1 OF 2

Inventors
James A. Petrie
Willie Williamson
By
Cushman, Darby & Cushman
Attorneys

SEALING DEVICE

This invention relates to a sealing device located between relatively rotating structures.

Considerable losses in performance and specific fuel consumption occur in rotating machinery such as the turbine of a gas turbine engine due to leakage at the turbine tip. A clearance between the tip of the turbine and a seal which is fixed to a stationary part of the engine has to be provided in order to allow for possible misalignment, thermal distortion and manufacturing tolerances and such a clearance is frequently larger than is desirable in order to meet these allowances.

The present invention provides a sealing device between two relatively movable structures in which the seal is axially movable relative to the structures and which helps to overcome the above disadvantages.

According to the present invention we provide a sealing device between two relatively rotatable structures including a seal part located between a relatively high-pressure zone and a relatively low-pressure zone the seal part being mounted on the first one of said structures and capable of axial movement relative to said structures, the seal part in combination with the second one of said structures forming at least one chamber subjected to a variable pressure, the chamber being in communication with the high-pressure zone, the arrangement being such that as the clearance between the seal part and the second structure decreases the pressure in the chamber rises and vice versa, the resultant pressure acting on the seal part varying to maintain the clearance at a substantially constant value.

Preferably the seal part has two circular lips which between them define an annular chamber. The inner lip may be provided with apertures for the flow of high-pressure air into the chamber which may be subdivided into a number of equispaced subchambers. The seal part may have a number of pairs of radial projections which engage on each side of blocks provided on a stationary member and the contact surfaces on the projections and blocks may be formed of silicon-nitride material. A sealing ring may be provided between an inner face of the seal part and a stationary circular support surface. The sealing ring may be of silicon nitride material and may be formed in a number of arcuate portions. Stops may be provided to limit the axial movement of the seal part and the space between the seal part and the circular support surface may be vented. The first structure may include the nozzle guide vane support ring of a gas turbine and the second structure may be the high-pressure turbine of a gas turbine engine. The seal part may be arranged to seal against the shroud of the high pressure turbine.

The invention will now be more particularly described with reference to the accompanying drawings in which:

FIG. 1 is a diagrammatic elevation of a gas turbine engine having one form of sealing device according to the present invention.

Figure 2:
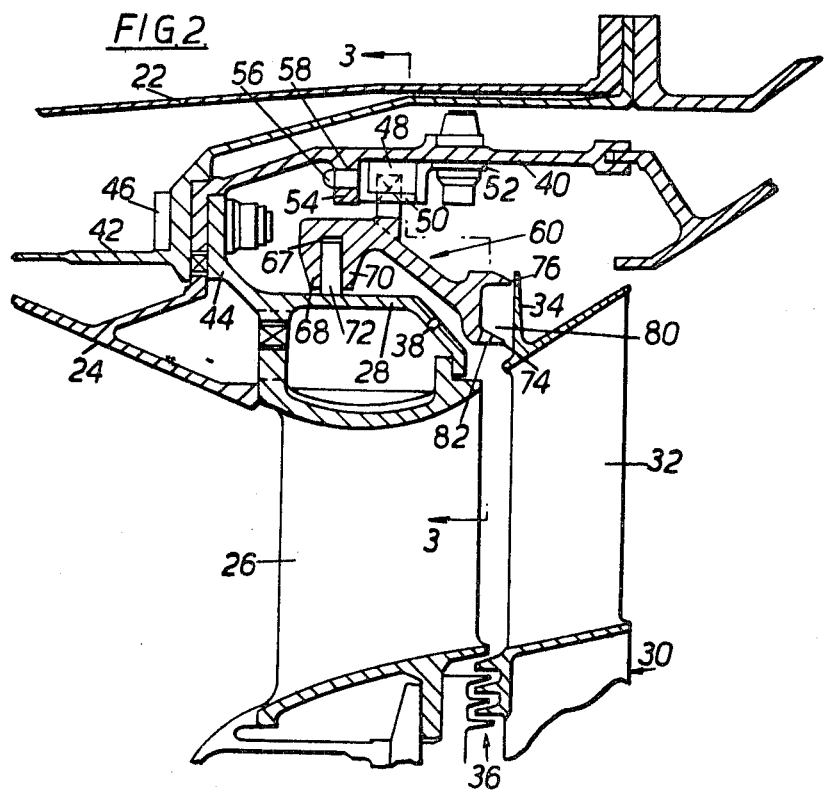
Figure 3:
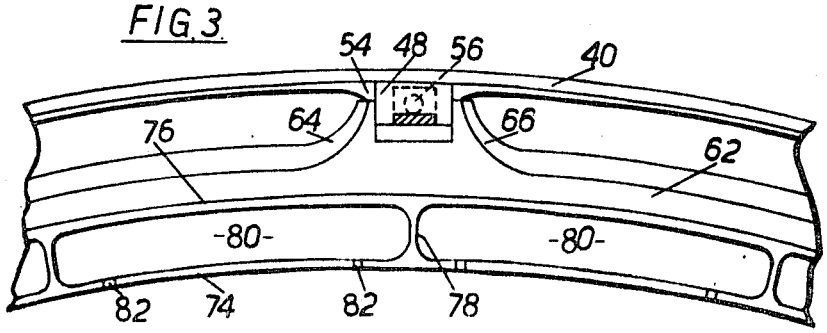
Figure 4:
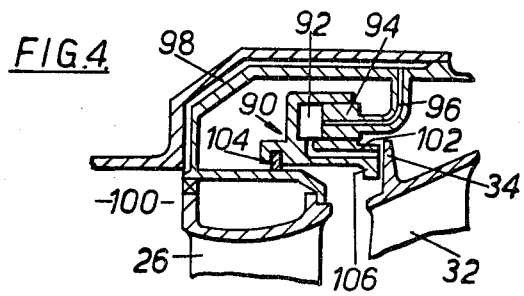
Figure 5:
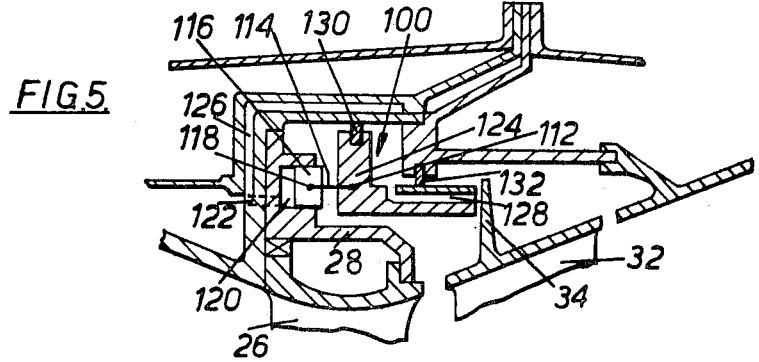
Figure 6:
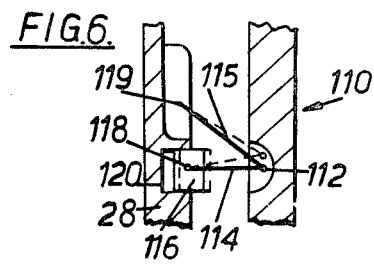

FIG. 2 shows an elevation of part of the gas turbine engine shown in FIG. 1 showing the sealing device in greater detail and FIG. 3 shows a part section on Line 3—3 of FIG. 2, FIG. 4 shows a modified form of sealing device according to the invention, FIG. 5 shows a further form of sealing device according to the present invention and FIG. 6 shows a plan view of part of the arrangement shown in FIG. 5.

In the FIGS., a gas turbine engine 10 includes in flow series an intake 12, compressor means 14, a combustion means 16, turbine means 18 and an outlet 20.

The combustion means 16 has a housing 22 in which are located a combustion chamber 24, a plurality of nozzle guide vanes 26 secured in a support ring 28 and a high-pressure turbine 30 mounted on a shaft (not shown). The turbine 30 has a plurality of equispaced blades 32 which each have a radial shroud 34. Inwardly of the blades 32 the turbine has two labyrinth seals only one of which is shown 36. The support ring 28 has a number of bleed holes 38. A generally cylindrical member 40 is secured between a heat shield 42 and a flange 44 of the support ring 28 by means of bolts 46. At equispaced locations of the inside of the member 40, a number of silicon nitride blocks 48 are mounted on pegs 50 which are secured between brackets 52 attached to the member 40 and lugs 54 which are integral with the member 40. The pegs 50 each have pins 56 which engage in an aperture 58 in each lug 54. The brackets 52 and lugs 54 provide stops which limit the rearward and forward movement respectively of sealing part 60.

The sealing part 60 which is generally annular in form and coaxial with the turbine shaft is located between the cylindrical member 40 and the nozzle guide vane support ring 28. The sealing part 60 has a circumferential rim 62 which is provided with a number of pairs of equispaced radial projections 64 and 66 which are located on each side of each silicon nitride block 48.

A circumferential groove 67 is formed between two annular flanges 68 and 70 which are integral with the sealing part 60. A silicon nitride sealing ring 72 formed of a number of arcuate portions is located within the groove 67 and the inside face of the ring 72 bears on the support ring 28. The end of each arcuate portion is formed with a shoulder and a projection so that the projection on one portion engages in the shoulder of the adjacent portion thus providing a continuous ring of constant thickness which can be assembled easily in the groove 67.

The right hand side or rear of the sealing part 60 has inner and outer sealing lips 74 and 76 respectively and a number of equispaced radial lands 78. The lips 74 and 76 and lands 78 between them form the boundaries of plurality of recesses 80. Two vent holes 82 for each chamber 80 are formed through the inner lip 74.

When the engine is running the gaseous combustion products flow out of the combustion chamber 24 past the nozzle guide vanes 26 and a majority of the gas flows past the turbine blades 32. A small amount of gas flows through the clearance between the lips 74 and 76 and the radial shroud 34. The forces acting on the sealing part result from the static pressure at the exit from the nozzle guide vanes 26, the static pressure at the exit from the turbine, the static pressure between the lips, 74, 76 the friction between the silicon nitride blocks 48 and the sealing part and between the ring 72 and the support ring 28. The resultant force urges the sealing part towards the radial shroud 34 and the size of the clearance depends upon the lips diameters, the size of the holes 82 and the diameter of the support ring 28 and the clearance can be predetermined by suitable choice of the diameter of the holes 82.

Under normal running conditions the resultant force on the sealing part maintains the clearance at a constant predetermined value and the pressure in the chambers 80 between the lips 74, 76 remains substantially constant. If the clearance should decrease the pressure in the chambers will rise and the resultant force will cause the sealing part to move to the left, the pressure in the chambers will drop and the sealing part will be balanced in the position to give the required clearance and the converse will happen if the clearance increases. If, in an extreme case the sealing lips close completely against the radial shroud, the pressure will build up in the chambers by means of gas flowing into the chambers through the holes 82, to a value equal to the pressure at the exit from the nozzle guide vanes 26 and the sealing part will lift off the shroud. The pressure in the chambers will stabilize and the desired clearance will be maintained.

If the sealing part should move forwards i.e. to the left in FIG. 2 to its extreme position the seal part could seal against the rear face of the supporting ring 28, thus cutting off the supply of gas to the space between the sealing part and the support ring. However, gas can enter this space through the bleed holes 38 allowing pressure to build up and urge the sealing part rearwards thus allowing the gas flowing past the nozzle guide vanes to act on the forward face of the sealing part.

The chambers allow the sealing part to sense local variations in pressure around the shroud although only one completely annular chamber need be provided. These variations may be due to the annular shroud formed by the radial shrouds on each blade not being completely flat because of the manufacturing tolerances on the blade roots and the slots into which they fit on the turbine disc; thus the annular shroud may be 'stepped' and local variations in pressure may be caused. Whilst it is desirable that the shroud is flat all round, small variations are allowable. Overall flatness may be achieved by rigidly fixing the blades to the disc (e.g. by welding) and machining the annular shroud on assembly.

The construction described with reference to FIGS. 2 and 3 is 'fail-safe' in the sense that should a portion of the lips 74, 76 fail a small leak will develop but the remaining unaffected chambers 80 will enable the sealing part to operate satisfactorily.

The labyrinth seal 36 can be replaced by a sealing device as above described and can be mounted in the engine either independently of or connected to the sealing part 60.

In FIG. 4, an annular seal part 90 has a multiplicity of small cylinders on corresponding pistons 94. A bore 96 passes through the pistons and is in communication via a passage 98 with high pressure air from the space 100. A series of passages 102 connect the cylinder with the front face of the seal part so that air from the space 100 can flow to the rear face. A sealing ring 104 is provided between the seal part 90 and the support ring 28 and the front face has an annular rim 106. When the seal part is clear of the shroud 34 high-pressure air passes from the space 100 and flows between the rear face and the shroud. The air flowing past the vanes 26 acts on the rim 106 and urges the seal part towards the shroud. As the gap closes the pressure in the cylinders 92 and passages 102 rises and the seal part is moved clear of the shroud. By suitable choice of the cylinder and rim dimensions the seal part can be made to stabilize at a predetermined clearance.

In FIGS. 5 and 6 a similar arrangement to that shown in FIG. 4 is illustrated. A seal part 110 is pivotally connected at 112 by a link 114 at 118 to a number of pistons only one of which, 116 is shown. A further link 115 is connected at one end to seal part at 112 and at the other end to a fixed pivot 119 on the support ring 28, to prevent rotation of the seal part 110. The piston 116 slides in a cylinder 120 formed in an extension of the ring 28. High-pressure air from the space 100 has access to the cylinder 120 via a passage 122 and to a space 124 via a passage 126 and thence to the rear face of the seal part through passages 128. The high-pressure air cannot escape from the space 124, except through passages 128 because of two sealing rings 130 and 132 mounted between the seal part and a stationary portion of the engine.

The operation of this arrangement is similar to that described with reference to FIG. 4 except that no rim equivalent to rim 106 is provided and the air passing through the vanes 26 acts on the forward face of the seal part. At the same time the link system provides a self clearing device; should the rotating radial shroud 34 come into contact with the seal face the friction would swing the seal 110 on the links 114 and 115 thus lifting it away from the rotating shroud.

Both the constructions shown in FIGS. 4 and 5 can be modified to provide another annular flange having a chamber similar to passages 102 and 128 in communication with high pressure air. The passages can be arranged to open out onto the turbine disc inwardly of the blade 32 thus replacing the labyrinth seal 36 in like manner as one of the modified forms of sealing device described with reference to FIG. 2 and 3.

We claim:

1. A sealing device between two relatively rotatable structures including a seal part located between relatively high-pressure zone and a relatively low pressure zone, the seal part being sealingly mounted on the first one of said structures and capable of axial movement relative to said structures, the seal part in combination with the said one of said structures forming at least one chamber subjected to a variable pressure, the chamber being in communication with the high-pressure zone and the arrangement being such that as the clearance between the seal part and the second of said structures decreases the pressure in the chamber rises and vice versa, the resultant pressure acting on the seal part varying as the clearance varies to maintain the clearance at a substantially constant value, and the seal part and the first of said structures, in combination form a piston and cylinder arrangement, the cylinder being in communication both with a supply of relatively high-pressure air and the clearance between the sealing device and the second of said structures, a supply of relatively medium pressure air acting on the seal part in opposition to the force exerted on the seal part by the relatively high-pressure air.

2. A sealing device according to claim 1 in which the medium pressure air acts on an annular rim adjacent the rear face of the seal part.

3. A sealing device according to claim 1 in which the medium pressure air acts on the forward face of the seal part.

4. A sealing device according to claim 1 in which the seal part is connected to a piston and to the first structure by a link system so that the seal part can swing by means of the link system about a fixed point on the first of said structures.

5. A sealing device according to claim 4 in which the link system comprises a first link pivotally connecting the piston and the seal part and a second link pivotally connecting the seal part to a fixed point on the first of said structures.

* * * * *